Feb. 1, 1966 A. C. CUVA 3,232,550

TAPE REEL

Filed Aug. 16, 1963

INVENTOR.
ANGELO C. CUVA
BY Harvey G. Lowhurst
ATTORNEY

United States Patent Office 3,232,550 Patented Feb. 1, 1966

3,232,550
TAPE REEL
Angelo C. Cuva, Santa Clara, Calif.
(1024 Sumac Drive, Sunnyvale, Calif. 94086)
Filed Aug. 16, 1963, Ser. No. 302,547
6 Claims. (Cl. 242—71.8)

This invention relates to precision reels and more particularly to an improvement in the structure and method of manufacture of a precision reel for the storage of magnetic tape.

Magnetic recording and reproducing devices widely employed in the computer, data processing and entertainment fields utilize very long narrow magnetically coated strips of material upon which suitable signals are recorded. Such strips are commonly known as magnetic tape.

Long strips of magnetic tape are most efficiently stored by being rolled or wound in layers around the hub of a tape reel. When recording information upon the tape or reproducing the information previously recorded on the tape, the usual procedure is to mount a supply reel of tape upon a drive shaft, thread the tape past a recording and/or reproducing transducer, and attach the beginning of the tape to a second reel called a take-up reel. By means of a tape drive mechanism clamping the tape, the tape is driven at a selected speed past the transducer and the reels respectively supply and take-up the tape at varying angular speeds such that the tape remains taut at all times regardless of the amount of tape on either reel.

The tape reels are very frequently subjected to extremely rapid starting and stopping speeds, requiring that they be accurately balanced and be very rigidly constructed. The parts comprising the reel must be maintained in proper operating relationship with each other in spite of rough handling, high acceleration and deceleration forces during use of the reel.

Flanges or outer discs of a reel must be maintained in a parallel relationship with each other in order to prevent wobble or lateral movement of the flanges during rotation of the reel. Wobbling flanges may scrape against the edges of the tape being wound upon or off of a reel and thereby seriously slow down or seriously damage the tape or the tape deck. In fact, rigid specifications of tape reels have been set down such as, for example, military specification MIL–R–22842 (SHIPS) and supplements imposing very rigid requirements on lateral runout and other dimensions.

Since a reel must be started and stopped within very short periods of time it is necessary that the rotational inertia of a reel be kept at a minimum value. Low rotational inertia of the reel permits a small motive power to bring it up to full operating speed in the required short period of time and permits a small braking power to be used to bring the reel to a stop in the required short period of time.

Aluminum has been found to meet the inertia and strength requirement of magnetic tape reels. However, a serious problem has been encountered when aluminum reel parts such as hubs and flanges are fastened together by means of fasteners such as screws, rivets, nuts, bolts and washers that are made of a metal other than aluminum, such as, for example, high strength steel.

The problem encountered is that of chemical or electrolytic action between the steel fastener and the aluminum parts in contact with the fastener. In addition corrosion of the steel fastener itself by contamination in the atmosphere creates serious problems. Electrolytic action between dissimilar metals, or metal oxide which is usually present to some extent on the surface of all metals and invariably present on the surface of aluminum causes corrosion at the interfaces of the two dissimilar metals.

Corrosion at the interfaces frequently causes a loosening of the fastener thereby destroying the rigid attachment of the parts of the reel to one another resulting in loose flanges destroying flange parallelism and producing runout. Aluminum itself is, however, normally not corroded by the usual atmospheric environment in which tape reels are operated. It has heretofore not been found possible to utilize aluminum screws, bolts, or nuts as fasteners of the reel parts since the tensile strength of aluminum is not sufficient to pass the tests imposed by applicable performance and environmental specifications.

It is therefore an object of this invention to provide an improved tape reel.

It is another object of this invention to provide an improved tape reel comprised of parts having low rotational inertia and having such parts rigidly held together by fasteners that will not loosen by corrosion.

It is a further object of this invention to provide a tape reel comprised of parts rigidly held together by non-corrosive fasteners.

It is a still further object of this invention to provide for an easily and economically manufactured tape reel.

Another object of this invention is to provide an improved method of fastening aluminum parts together with aluminum fasteners.

Further objects and advantages of the present invention will become apparent to those skilled in the art to which the invention pertains as the ensuing description proceeds.

The stated objects are realized, according to the present invention, by utilizing a press fit, either directly or indirectly, to fasten the flanges to the hub without use of dissimilar metals. In one embodiment of this invention an oversized rivet-shaped fastener of the same material as the flanges and the hub is shrunk by freezing and inserted into aligned fastener openings in the hub and flanges. As the cooled and contracted fastener subsequently warms to ambient temperature, it expands to its original size to firmly grip the peripheral surface of the fastener openings in the hub and to thereby hold the flanges firmly to the hub. Since the fastener is comprised of the same material as the hub and flanges, it is chemically and electrolytically neutral with respect thereto and no electrolytic action takes place to weaken the bond.

In another embodiment of this invention the bond between the flanges and the hub is produced directly by press fitting the flanges, constructed with a tapered guiding surface, upon the shoulders of the hub and thereafter securing the flanges to the hub by a cementitious material.

The features of novelty that are considered characteristic of this invention are set forth with particularity in the appended claims. The organization and method of operation of the invention itself will best be understood from the following description when read in connection with the accompanying drawing in which:

Figure 1:
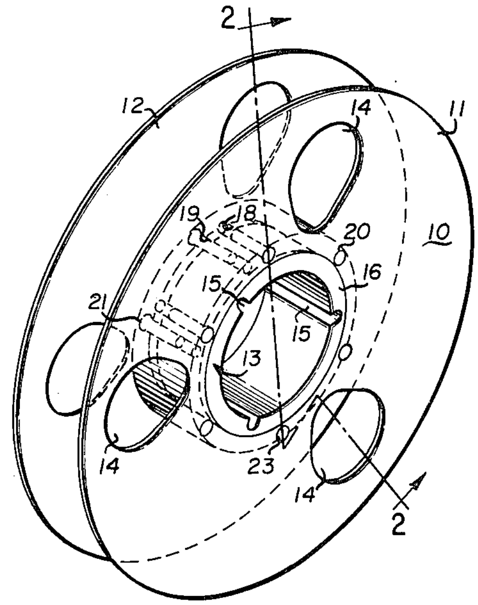
FIGURE 1 is a perspective view of one embodiment of the tape reel of the present invention.

Reference to FIG. 1 shows a spool or reel 10 which is comprised of a pair of flanges or circular discs 11 and 12 spaced apart from each other by attachment, at opposite ends, to a cylindrically shaped hub 13. Each disc 11 and 12 is provided with a circular cutout centered therein. Each disc is comprised of a material having a high strength to weight ratio; for example aluminum or magnesium. Since reel 10 is to be rotated at high speed about an axis passing through the center of and normal to each disc 11 and 12, the rotational inertia of reel 10 may be reduced considerably, without greatly reducing its strength, by removing portions of disc material from near the outer periphery. Such inertia reduction is shown in FIG. 1 as cutouts 14 provided in discs 11 and 12. Cutouts 14 also provide finger access to hub 13 for beginning winding of a length of tape on reel 10 about hub 13.

The inner peripheral surface of hub 13 may be provided with mounting grooves 15 adapted to removably engage a drive shaft of a reel engaging apparatus (not shown) such as a tape deck.

Figure 2:
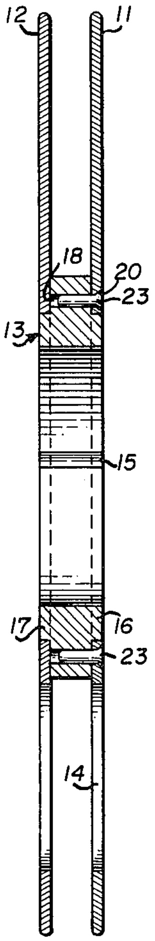
FIGURE 2 is a cross sectional view of the tape reel of FIG. 1 taken along line 2—2.

As best seen in FIG. 2, hub 13 is provided with annular outwardly depending mounting bosses 16 and 17 at each end thereof. Disc 11 is mounted on hub 13 by positioning the circular cutout of the disc over mounting boss 16 and against one end face of hub 13. Likewise, disc 12 is mounted on hub 13 by positioning the circular cutout of the disc over mounting boss 17 and against the other end face of hub 13. Circular flanges 11 and 12 are thus centered about the axis of hub 13 and are positioned substantially parallel with respect to each other.

There will now be described, with reference to FIG. 2, the improved method and structural details of maintaining the discs 11 and 12 in rigid relationship with hub 13 and in parallel relationship with each other. Each end face of hub 13 outside of bosses 16 and 17 is provided with a series of cylindrical bores 18 and 19 respectively which extend through hub 13. Each bore is preferably parallel to the axis of rotation of reel 10 and on a common pitch diameter. Each series of bores is angularly displaced with respect to the other so that since they extend through hub 13, each end face shows twice as many openings as there are bores in one series. Flange 11 is also provided with a series of countersunk openings 20, which are aligned with corresponding ones of bores 18 when mounted over a boss 16 and properly positioned. Flange 12 is likewise provided with a series of countersunk openings 21 aligned with bores 19.

Individual fasteners 23 are inserted into each pair of aligned openings 20 and bores 18 so that its head portion engages the flange and its shank portion engages the bore. Each fastener 23, by securely gripping the peripheral surface of a bore by dilation, rigidly secures the flanges permanently to hub 13 and parallel to one another. Fasteners 23, utilized in the illustrated embodiment of the present invention, are comprised of a material that is chemically and electrolytically neutral with respect to the material of which hub 13 and discs 11 and 12 are comprised. The preferred material for fastener 23 is the same as the material of hub 13 and discs 11 and 12.

A suitable fastener 23 includes a cylindrical shank portion and a sloped head portion continuous with the shank portion. Fastener 23 is thus shaped similar to a countersunk head rivet. The diameter of the shank portion, at ambient or room temperature, is carefully selected to be somewhat greater than the diameter of bores 18 and 19. Thus a fastener 23 cannot be inserted into a pair of aligned bores and openings when hub 13, discs 11 and 12 and fastener 23 are all at the same ambient temperature.

In order that a fastener 23 may be inserted into a pair of aligned bores and openings, the diameter of the fastener 23 is temporarily reduced to a value not greater than the diameter of the bores 18 and 19.

This is most easily accomplished by lowering the temperature of fastener 23 to a value sufficiently low so that the material comprising the fastener 23 contracts to reduce the diameter of the shank and head until it fits into bores 18 and 19.

One method of cooling the fastener 23 is by immersion into liquid nitrogen which is typically maintained at a boiling temperature of minus 100° F. Such contraction permits easy insertion of fastener 23 into a pair of aligned bores and openings. If desired, cooled fastener 23 may be inserted with the aid of steady pressure applied by a pressing fixture.

Upon heating up to ambient temperature, fastener 23 expands or dilates tightly against and firmly grips the walls of the bore. Thus the fastener 23 firmly maintains the discs 11 and 12 in proper operating relationship with hub 13 and parallel with each other.

Since fasteners 23 are made of the same material as discs 11 and 12 and hub 13, there will be no electrolytic action to cause corrosion. Since aluminum itself is usually completely protected by a very thin film of aluminum oxide, the surfaces of fastener 23 are protected from corrosion.

The method heretofore described for fastening parts together has other advantages. Simple drilling of bores and openings in a part is more economical than providing a threaded opening such as would be required if conventional screws were utilized. In addition, there is no hammering required such as would be the case with simple rivets, to cause the fasteners to grip the discs 11 and 12 and hub 13, thereby assuring that the parts are not unbalanced or damaged during assembly.

Figure 3:
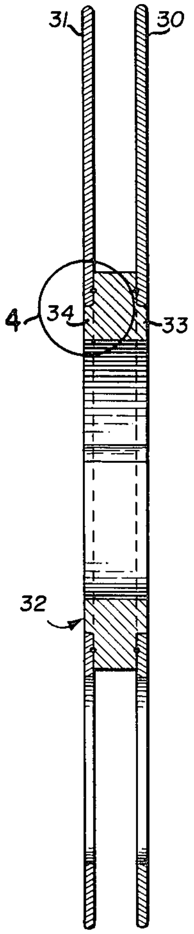
FIGURE 3 is a cross sectional view, similar to that of FIG. 2, of another embodiment of the tape reel of the present invention.
Figure 4:
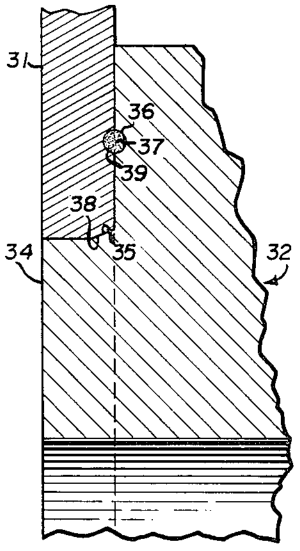
FIGURE 4 is an enlarged fractional cross sectional view of the encircled portion of FIG. 3 marked 4.

There is illustrated in FIGS. 3 and 4 another form of the present invention wherein a pair of flanges 30 and 31 are secured to a hub 32 without the use of screws, bolts, nuts, or rivets. Each end face of hub 32 is provided with a boss 33 and 34 having a tapered shoulder 35 immediately adjacent to the end face as best seen in FIG. 4. A circumferential shallow groove 36 is provided in each end face of hub 32 for receiving a fastener material 37.

The central opening of flanges 30 and 31 is provided with a tapered shoulder 38 which conforms to either boss 33 and 34 of the hub 31 when mounted thereon and the cylindrical portion of the central opening is dimensioned for press-fitting upon the boss. Flanges 30 and 31 are also provided with a circumferential groove 38 which is in alignment with groove 36 when the flange is press-filled upon the mounting boss. In this manner grooves 36 and 38 are opposite to one another and provide a closed channel which is filled with fastening material 37.

On assembling flanges 30 and 31 on hub 32, grooves 36 and 38 are filled with a material 37 which upon drying or heating will firmly bond to the surfaces of the grooves and thereby secure the parts together. Thereafter, each flange is press-fitted upon its mounting boss, the tapered portion providing alignment means. A typical fastener material 37 may be, for example, a thermosetting nylon-epoxy adhesive which may be cured while applying approximately 25 pounds per square inch pressure to the adjacent parts while maintaining the adhesive material 37 and parts at approximately 350° F. for about one hour.

The flanges may be press-fitted over the mounting bosses by means of a suitable steady pressure applying fixture. Such a pressure applying fixture will press the flange firmly upon the mounting boss and urge the tapered shoulder of the flange into engagement with the tapered shoulder of the mounting boss for good alignment. It has been found that a taper of about 20 degrees from the axis of flange 31 and occupying a portion of about one-third the thickness of the flange is eminently suitable to achieve a good press fit and proper alignment of parts.

The embodiment of the present invention described and illustrated in FIG. 3 has the advantage that no metal fasteners are utilized. Grooves 36 and 39 are shown respectively on the end face of hub 32 and a side of flange 31 since such locations are more easily machined. The adjacent grooves for receiving the fastening material may be provided at other suitable locations such as the tapered shoulders if desired.

While the principles of the invention have been made clear in the illustrative embodiments, there will be obvious to those skilled in the art, many modifications in structure, arrangement, proportions, the elements, materials, and components, used in the practice of the invention, and otherwise, which are adapted for specific environments and operating requirements, without departing from these principles. The appended claims are therefore intended to cover and embrace any such modifications within the limits only of the true spirit and scope of the invention.

What is claimed is:

1. A tape reel comprising:

a cylindrically shaped hub adapted for axial engagement with a rotatable spindle and comprised of a first, lightweight, corrosion-resistive metal, said hub including a plurality of axially extending, cylindrical, smooth-walled bores;

a flange comprised of a second, lightweight, corrosion-resistive metal electrolytically neutral with respect to said first metal and mounted concentrically to said hub, said flange including a plurality of openings positioned in registry with said bores; and expandable fastener means passing through each opening and bore in registry for securing said flange to said hub, said fastener means having a head portion engaging said flange and an axially extending, cylindrical, smooth-surfaced body portion gripping the sidewall of the bore, said fastening means being comprised of a metal electrolytically neutral with respect to said first and second metal.

2. A tape reel comprising:

a cylindrically shaped hub adapted for axial engagement with a rotatable spindle and comprised of a first, lightweight, corrosion-resistive metal, said hub including a mounting boss extending outwardly from an end face and a plurality of axially extending, cylindrical, smooth-walled bores located about said boss;

a flange comprised of a second, lightweight, corrosion-resistive metal electrolytically neutral with respect to said first metal and mounted concentrically to said hub, said flange including a central opening dimensioned for engaging said boss and a plurality of openings positioned in registry with said bores; and expandable fastener means passing through each opening and bore in registry for securing said flange to said hub, said fastener means having a head portion engaging said flange and an axially extending, cylindrical, smooth-surfaced a body portion gripping the sidewall of the bore, said fastening means being comprised of a metal electrolytically neutral with respect to said first and second metal.

3. A tape reel comprising:

a cylindrically shaped hub adapted for axial engagement with a rotatable spindle and comprised of a lightweight, corrosion-resistive metal, said hub including a mounting boss extending outwardly from an end face and a plurality of axially extending, cylindrical, smooth-walled bores disposed about said boss and extending through said hub;

a flange comprised of said metal and mounted concentrically to said hub, said flange including a central opening dimensioned for engaging said boss and including a plurality of openings positioned in registry with said bores about said central opening; and expandable fastener means passing through each opening and bore in registry for securing said flange to said hub, said fastener means having a head portion engaging said flange and an axially extending, cylindrical smooth-surfaced body portion adapted for gripping the sidewall of the bore, said fastening means being comprised of a further metal electrolytically neutral with respect to said aforementioned metal.

4. A tape reel comprising:

a cylindrically shaped hub adapted for axial engagement with a rotatable spindle and comprised of a first, lightweight, corrosion-resistive metal, said hub including a mounting boss extending outwardly from each end face and a plurality of axially disposed, cylindrical, smooth-walled bores arranged about each boss and extending through said hub;

a pair of flanges, comprised of a second, lightweight, corrosion-resistive, metal electrolytically neutral with respect to said first metal, mounted concentrically on opposite end faces of said hub, said flanges including a central opening dimensioned for engaging said bosses and each flange including a set of openings positioned in registry with different ones of said bores so that no openings of said pair of flanges are in registry with the same bore; and expandable fastener means passing through each opening and bore in registry for securing said flanges to said hub, said fastener means having a head portion engaging said flanges and an axially extending, cylindrical, smooth-surfaced body portion adapted for securely gripping the sidewall of the bore, said fastening means being comprised of a metal electrolytically neutral with respect to said first and second metal.

5. A tape reel in accordance with claim 4 in which said hub and flanges comprise aluminum.

6. A tape reel in accordance with claim 4 in which said plurality of smooth-walled bores are disposed on a common pitch circle diameter on said hub.

References Cited by the Examiner

UNITED STATES PATENTS

| | | | |
|---|---|---|---|
| 746,440 | 12/1903 | Austin. | |
| 1,266,379 | 5/1918 | Anderson | 242—71.8 |
| 1,704,033 | 3/1929 | Cautley. | |
| 1,786,781 | 12/1930 | Shoemaker | 161—146 X |
| 2,748,463 | 6/1956 | Mueller | 29—523 |
| 2,847,757 | 8/1958 | Mock | 29—523 |
| 3,035,958 | 5/1962 | Wilkins | 156—294 |
| 3,050,435 | 8/1962 | Fox | 156—294 |
| 3,056,563 | 10/1962 | Whitnah | 242—71.8 |
| 3,088,689 | 5/1963 | Perlini | 242—71.8 |

FOREIGN PATENTS

| | | |
|---|---|---|
| 975,627 | 10/1950 | France. |
| 1,298,482 | 6/1962 | France. |
| 948,510 | 6/1961 | Great Britain. |

OTHER REFERENCES

Spotts: Design of Machine Elements, 2nd edition, 5th printing, April 1957, Library of Congress Card Catalog No. 53-9200, page 487.

STANLEY N. GILREATH, *Primary Examiner.*

JORDAN FRANKLIN, M. J. COLITZ, *Assistant Examiners.*